United States Patent [19]

Caron et al.

[11] Patent Number: 4,547,039
[45] Date of Patent: Oct. 15, 1985

[54] HOUSING MOUNTABLE ON PRINTED CIRCUIT BOARD TO INTERCONNECT FIBER OPTIC CONNECTORS

[75] Inventors: Bernard G. Caron; John C. Hoffer, both of Harrisburg, Pa.

[73] Assignee: AMP Incorporated, Harrisburg, Pa.

[21] Appl. No.: 368,949

[22] Filed: Apr. 16, 1982

[51] Int. Cl.³ ............................................. G02B 5/14
[52] U.S. Cl. ........................... 350/96.20; 350/96.21
[58] Field of Search ....................................... 350/96.20

[56] References Cited

U.S. PATENT DOCUMENTS

| | | | |
|---|---|---|---|
| 4,081,208 | 3/1978 | Meade ........................ | 350/96.20 X |
| 4,152,041 | 5/1979 | Holiday et al. ................ | 339/147 P |
| 4,186,996 | 2/1980 | Bowen et al. .................... | 350/96.20 |
| 4,186,999 | 2/1980 | Harwood et al. ............ | 350/96.20 X |
| 4,188,708 | 2/1980 | Fredenksen .................. | 350/96.15 X |
| 4,255,015 | 3/1981 | Adams et al. ................ | 350/96.20 X |
| 4,268,114 | 5/1981 | d'Auria et al. .................. | 350/96.20 |
| 4,273,413 | 6/1981 | Bendiksen et al. ............. | 350/96.20 |
| 4,327,964 | 5/1982 | Haesly et al. .................. | 350/96.20 |
| 4,355,862 | 10/1982 | Kock ................................ | 350/96.20 |

*Primary Examiner*—William L. Sikes
*Assistant Examiner*—Akm E. Ullah
*Attorney, Agent, or Firm*—Adrian J. LaRue; Anton P. Ness

[57] ABSTRACT

A housing member has a profiled bore extending therethrough in one section of which a ferrule member containing an electro-optic member is secured by a removable retaining clip member that also acts as a heat sink member. Another ferrule member of a fiber optic connector terminated onto a fiber optic transmission member is disposed in another section of the profiled bore and is latchably secured therein by spring latching members secured in the housing.

12 Claims, 4 Drawing Figures

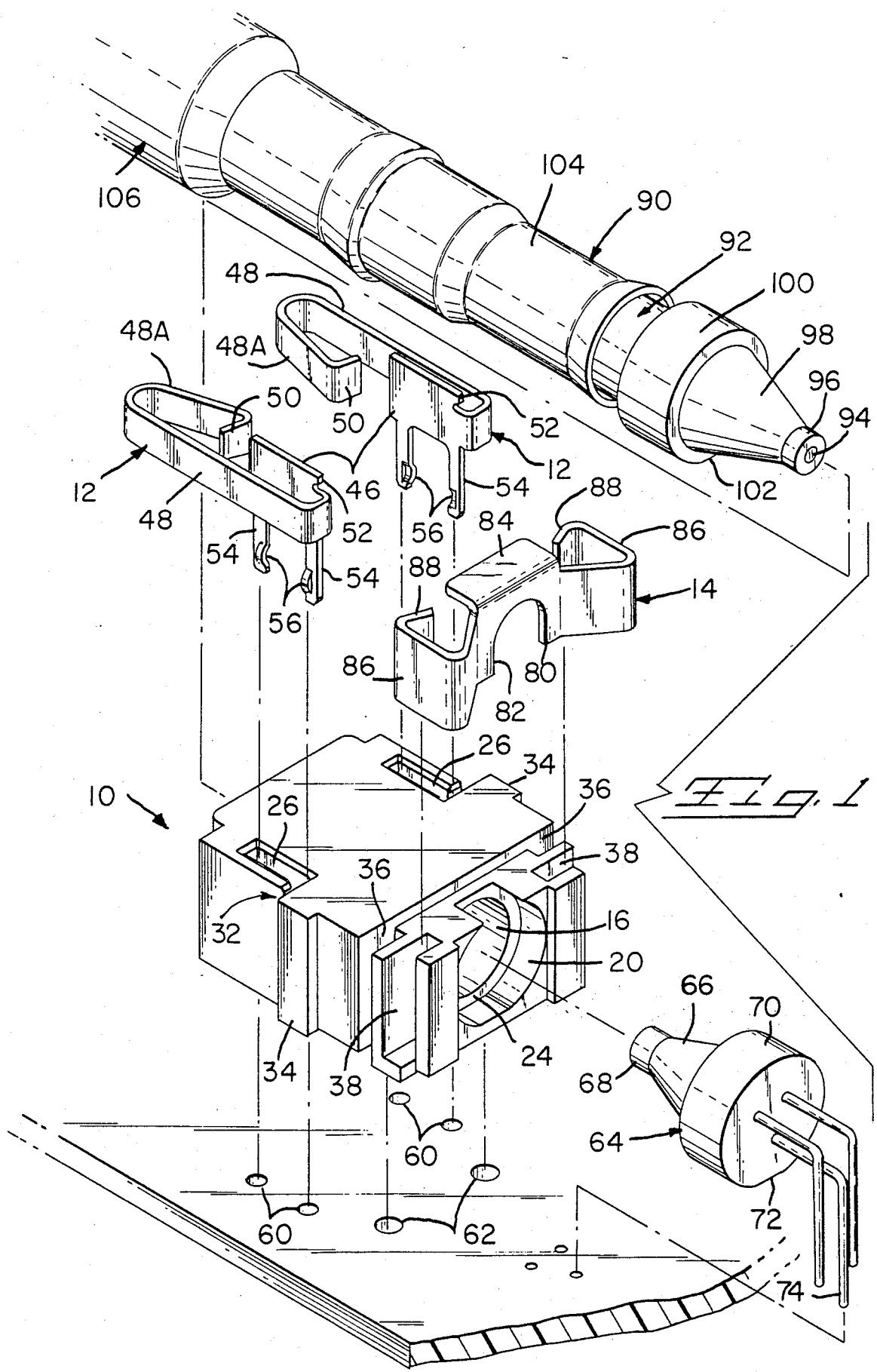

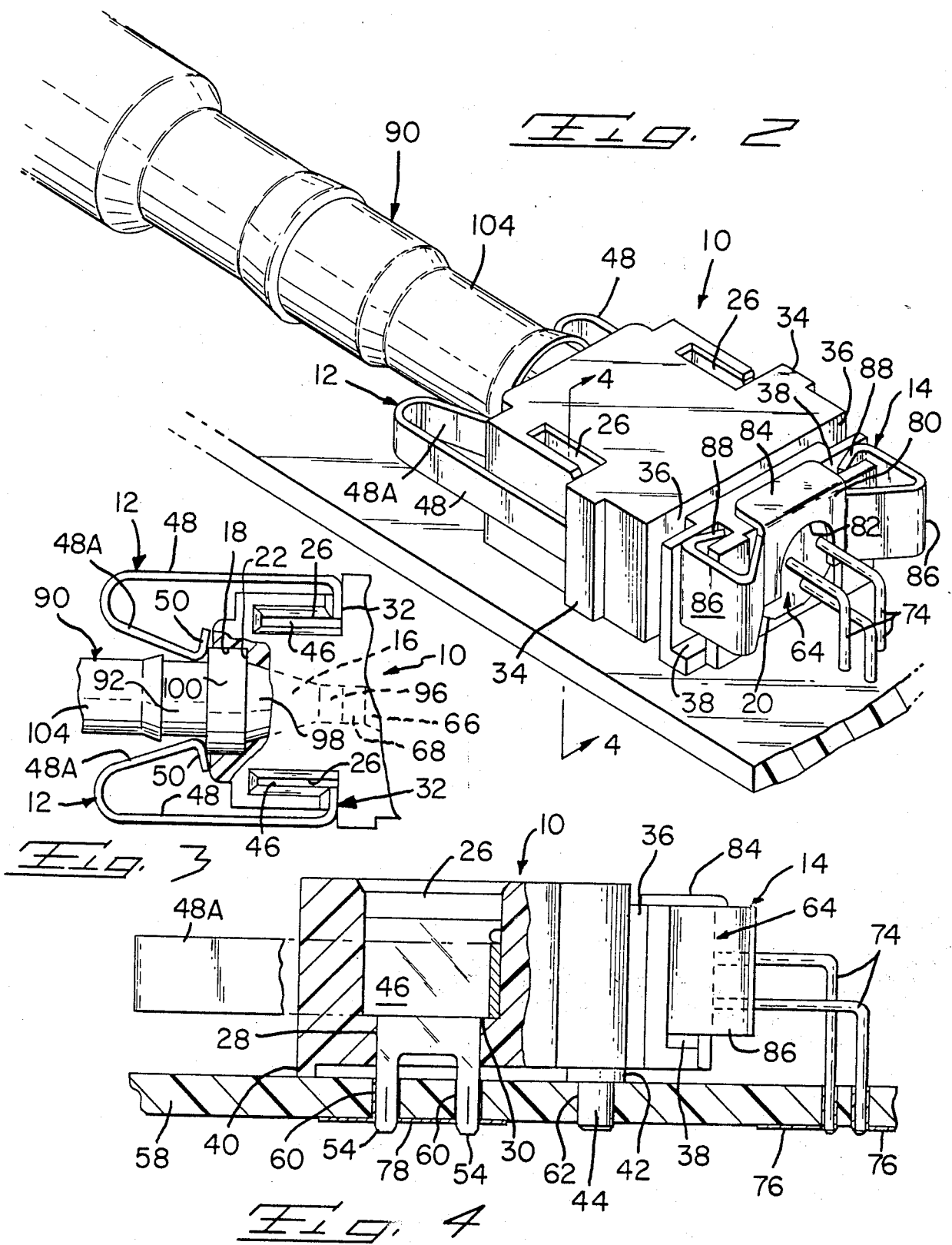

HOUSING MOUNTABLE ON PRINTED CIRCUIT BOARD TO INTERCONNECT FIBER OPTIC CONNECTORS

FIELD OF THE INVENTION

This invention relates to connector housings and more particularly to housings mountable on printed circuit boards to interconnect electro-optic devices and fiber optic connectors.

BACKGROUND OF THE INVENTION

U.S. patent application Ser. No. 328,323 filed Dec. 7, 1981 discloses a housing mountable on a printed circuit board and in a profiled bore of which is disposed a ferrule member. A metal clip member secures the ferrule member within the profiled bore by being itself secured onto the housing and also operates as a heat sink for an electro-optic member within the ferrule member. A fiber optic connector including a ferrule member terminated onto a fiber optic transmission member is securably connected to the housing within the profiled bore to interconnect the electro-optic member and the fiber optic transmission member. The housing, ferrule member, metal clip, and electro-optic member are all secured together as a device mountable onto a printed circuit board with no latching members for latchably securing a ferrule member of a fiber optic connector within the housing.

SUMMARY OF THE INVENTION

According to the present invention, a housing member has a profiled bore extending therethrough in one section of which a ferrule member containing an electro-optic member is secured by a removable retaining clip member that also acts as a heat sink member. Another ferrule member of a fiber optic connector terminated onto a fiber optic transmission member is disposed in another section of the profiled bore and is latchably secured therein by spring latching members secured in the housing.

According to another aspect of the present invention, the spring latching members have legs that are frictionally disposed in holes in a printed circuit board to secure the housing in position on the board prior to being soldered in place thereon.

BRIEF DESCRIPTION OF THE DRAWINGS

FIG. 1 is a perspective, exploded view of a housing and its parts for interconnecting ferrule members to form a fiber optic connection.

FIG. 2 is a perspective view showing the housing and parts assembled and mounted on a printed circuit board with fiber optic connectors latchably secured therein.

FIG. 3 is a part top plan view of the housing with a part of the housing broken away showing the latching members in engagement with the ferrule member of the fiber optic connector.

FIG. 4 is a view partially in section taken generally along the 4—4 of FIG. 2.

DETAILED DESCRIPTION OF THE PREFERRED EMBODIMENT

FIGS. 1 through 4 illustrate the invention which comprises a housing member 10, spring latching members 12, and retaining clip 14. Housing member 10 is preferably molded from a suitable plastic material and has a profiled bore 16 extending therethrough in the form of frusto-conical sections at each end thereof with a cylindrical section interconnecting the frusto-conical sections. The entrance to one end of profiled bore 16 has a substantially annular recess 18 which has a flat keying surface therein, whereas the other end of profiled bore 16 has a substantially annular recess 20 also with a flat keying surface therein. Stop surfaces 22, 24 are located respectively at the intersections of annular recess 18 with its associated frusto-conical section and annular recess 20 with its associated frusto-conical section, of profiled bore 16.

Slots 26 extend through housing member 10 and have smaller dimensioned sections 28 with stop surfaces 30 separating the larger and smaller sections of slots 26. Openings 32 are located in the sidewalls of housing member 10 and are in communication with the larger sections of slots 26 and they terminate at the position of stop surfaces 30. Openings 32 extend along the walls of projections 34 that extend outwardly from the sides of housing member 10. Recesses 36, 38 extend inwardly from the sides of housing member 10 and are parallel to one another. Projections 40, 42 extend outwardly from the bottom surface of housing member 10 with annular projections 44 extending outwardly from projections 42 and concentric therewith.

Latching members 12 are stamped and formed from a suitable metal having desirable spring characteristics and each latching member 12 includes a mounting section 46 from which extends a spring member 48 which includes a curved-back section 48A extending toward mounting section 46 and terminating in an inwardly-directed end 50. Projections 52 extend outwardly from the top of mounting sections 46. Mounting legs 54 extend outwardly from mounting sections 46 and contain arcuate projections 56 adjacent the outer ends thereof.

Latching members 12 are securely mounted in slots 26 of housing member 10 with mounting sections 46 positioned in the larger sections of slots 26 and bottoming against stop surfaces 30 with mounting legs 54 extending through the smaller sections 28 of slots 26 and extending outwardly beyond the bottom surface of housing member 10. Spring members 48 extend outwardly through openings 32 of housing member 10 and extend along the sides thereof with the curved-back sections 48A extending toward annular recess 18 and terminating adjacent thereto with inwardly-directed ends 50 being positioned adjacent annular recess 18. Projections 52 bite into housing member 10 thereby securing latching members 12 therewithin.

After spring latching members 12 have been secured within slots 26 of housing member 10, housing member 10 can now be mounted onto printed circuit board 58 with arcuate projections 56 of mounting legs 54 frictionally disposed in holes 60 in printed circuit board 58 while annular projections 44 are positioned within holes 62 therein. Arcuate projections 56 frictionally engage the walls of holes 60 thereby securing housing member 10 in position on printed circuit board 58 and mounting legs 54 extend slightly below a metal section 78 secured to board 58 to which mounting legs 54 are soldered thereby permanently securing housing member 10 on printed circuit board 58. Projections 40, 42 position housing member 10 away from printed circuit board 58 for cleaning purposes.

Housing member 10 is mounted on printed circuit board 58 adjacent electro-optic device 64 of the type disclosed in U.S. Pat. No. 4,186,996, the disclosure of which is completely incorporated herein by reference. Electro-optic device 64 can be either a light-transmitting device or a light-receiving device which is encapsulated within a ferrule member formed from a suitable plastic have resilient characteristics that enables the front end having a frusto-conical section 66 and cylindrical section 68 to be resiliently mated within the corresponding frusto-conical and cylindrical sections of profiled bore 16 with annular section 70 being disposed within recess 20. A flat surface 72 on annular section 70 mates with a corresponding flat surface within annular recess 20 to key the positioning of electro-optic device 64 within the profiled bore 16 of housing member 10. Electrical leads 74 of electro-optic device 64 are electrically connected to conductive paths 76 on printed circuit board 58. When electrical leads 74 are flow-soldered to conductive paths 76, mounting legs 54 are also soldered to metal section 78 secured to printed circuit board 58 thereby securing housing member 10 on printed circuit board 58. The heat from the flow-soldering operation may deform projections 44 in such a way as to expand the end of projections 44 thereby riveting projections 44 to printed circuit board 58 thereby providing an additional securing arrangement.

Retaining clip 14 is stamped and formed from a suitable metal having spring characteristics and includes a body section 80 having a U-shaped opening 82 therein which clears electrical leads 74 when body section 80 is disposed against electro-optic device 64. A stop member 84 is at right angles to body section 80 and engages housing member 10 to position retaining clip 14 thereon. Spring arms 86 extend outwardly from body section 80 and inwardly-directed ends 88 which are slidably disposed in recesses 38 when retaining clip 14 is moved into a retaining position on housing member 10 to retain electro-optic device 64 within housing member 10 and to apply an axial force thereto to properly resiliently seat frusto-conical section 66 and cylindrical section 68 within the corresponding sections of profiled bore 16 as a result of body section 80 engaging the rear surface of electro-optic device 64.

If desired, housing member 10 can be inserted within a rectangular opening of a mounting panel with projections 34 engaging one surface of the panel and a U-shaped clip (not shown) has its legs positioned within recesses 36 to retain housing member 10 in position within the opening of the panel.

Fiber optic connector 90 includes a plastic ferrule member 92 into which a fiber optic transmission member is positioned with transmission core member 94 having its end coincident with the end of cylindrical section 96. Frusto-conical section 98 extends between cylindrical section 96 and annular section 100 which has a flat surface 102. Metal crimping ferrule 104 is crimped onto ferrule 92 and onto outer jacket 106 of the fiber optic transmission member thereby effectively terminating the fiber optic transmission member. The plastic material of which ferrule member 92 is made is suitably resilient so that frusto-conical section 98 and cylindrical section 96 matably and resiliently engage corresponding frusto-conical section and cylindrical section of profiled bore 16 of housing member 10 when they are inserted thereinto thereby effecting an operable interconnection between fiber optic connector 90 and electro-optic device 64. Fiber optic connector 90 is latchably secured within the profiled bore of housing member 10 by means of spring members 48 with inwardly-directed ends 50 engaging onto the rear surface of annular section 100 as illustrated in FIG. 3 with annular section 100 fitting within annular recess 18 and flat surface 102 keyingly engaging the flat surface within recess 18. Spring members 48 are cammed outwardly when fiber optic connector 90 is being inserted into housing member 10 so that fiber optic connector 90 can be inserted into housing member 10 with low force and is removed from housing member 10 with substantially higher forces. Plastic ferrule member 92 is of the type disclosed in U.S. Pat. No. 3,999,837, the disclosure of which is completely incorporated herein by reference.

Instead of electro-optic device 64 being positioned in recess 20 of housing member 10, a metal can type of electro-optic device identified as TO-18/46 can be bonded within recess 20. A TO-18 electro-optic device having a plastic cap is press fitted into recess 20. Retaining clip 14 serves the dual function of retaining the electro-optic device in position in housing member 10 and also defines a heat sink to carry heat away therefrom.

If desired, another fiber optic connector similar to that of fiber optic connector 90 can be positioned within recess 20 of housing member 10 and retained therein by retaining clip 14 to provide an optical coupling device for optically coupling the terminated ends of fiber optic transmission members.

We claim:

1. A connector housing for interconnecting fiber optic connectors comprising:
   housing means having a profiled bore extending therethrough in which ferrule members of the fiber optic connectors are to be disposed;
   latching means secured in said housing means defining spring member means extending outwardly from one end of said housing means including curved-back sections that extend toward an entrance to said profiled bore, inwardly-directed ends of said curved-back sections being positioned adjacent said entrance so that when a ferrule member of a fiber optic connector is to be positioned in said profiled bore, the ferrule member engages said curved-back sections camming them away from each other enabling the ferrule member to be seated in said profiled bore and said inwardly-directed ends engage a shoulder of the ferrule member thereby latchably maintaining the ferrule member in said profiled bore.

2. A connector housing as set forth in claim 1 wherein said latching means include mounting means extending outwardly from a bottom surface of said housing means for frictional engagement with holes in a printed circuit board to mount said housing means thereon.

3. A connector housing as set forth in claim 2 wherein said bottom surface of said housing means includes projections to space said housing means from the printed circuit board.

4. A connector housing as set forth in claim 1 wherein said housing means includes recess means adjacent another entrance to said profiled bore, retaining clip means having body section means for extending across said other entrance and including a U-shaped opening, spring arm means extending outwardly from said body section means and having inwardly-directed end means for slidable engagement with said recess means when a ferrule member of a fiber optic connector is disposed in said profiled bore through said other entrance with said body section means engaging the ferrule member thereby maintaining the ferrule member in said profiled bore.

5. A connector housing as set forth in claim 4 wherein said body section means includes stop member means for engagement with said housing means to limit movement of said inwardly-directed end means along said recess means.

6. A connector housing as set forth in claim 1 further including mounting means extending outwardly from a bottom surface of said housing means for frictional engagement with holes in a printed circuit board to mount said housing means thereon.

7. A connector housing as set forth in claim 1 further including projections engaging a surface of a mounting panel upon insertion of said housing within a rectangular opening of said panel, recesses in said housing proximate said projections, and a U-shaped clip having legs positioned within said recesses to retain said housing member within said opening.

8. A connector housing for interconnecting a fiber optic connector and an electro-optic device comprising:

housing means having a profiled bore extending therethrough in which ferrule members of said fiber optic connector and said electro-optic device are to be disposed;

latching means secured in said housing means defining spring member means extending outwardly from one end of said housing means including curved-back sections that extend toward an entrance to said profiled bore, said entrance for receiving a ferrule member of said fiber optic connector, inwardly-directed ends of said curved-back sections being positioned adjacent said entrance so that when said ferrule member of said fiber optic connector is to be positioned in said profiled bore, the ferrule member engages said curved-back sections camming them away from each other enabling the ferrule member to be seated in said profiled bore and said inwardly-directed ends engage a shoulder of the ferrule member thereby latchably maintaining the ferrule member in said profiled bore;

recess means in said housing means adjacent another entrance to said profiled bore, said other entrance for receiving a ferrule member of an electro-optic device; and retaining clip means having a body section means for extending across said other entrance and including a U-shaped opening, spring arm means extending outwardly from said body section means and having inwardly-directed end means for slidable engagement with said recess means when said ferrule member of said electro-optic device is disposed in said profiled bore through said other entrance with said body section means engaging and securing said ferrule member of said electro-optic device in said profiled bore, and stop member means for engagement with said housing means to limit movement of said inwardly-directed end means along said recess means.

9. A connector housing as set forth in claim 8 further including mounting means extending outwardly from a bottom surface of said housing means for frictional engagement with holes in a printed circuit board to mount said housing means thereon.

10. A connector housing as set forth in claim 8 further including projections engaging a surface of a mounting panel upon insertion of said housing within a rectangular opening of said panel, other recesses in said housing proximate said projections, and a U-shaped clip having legs positioned within said other recesses to retain said housing member within said opening.

11. Latching means for latchingly securing a fiber optic connector in a profiled bore of a housing, comprising a pair of latching members each having a mounting section securable in said housing laterally of said connector, and a spring member extending outwardly from said mounting section and forwardly of one end of said housing and curving back toward an entrance to said profiled bore, inwardly-directed ends of said spring members positioned adjacent said entrance and engageable onto and cammed away from each other by a shoulder of a ferrule member of said fiber optic connector that has been positioned into said profiled bore between said spring members.

12. Latching means as set forth in claim 11 further comprising mounting legs extending outwardly from said mounting sections and from a bottom surface of said housing for frictional engagement with holes in a printed circuit board to mount said housing thereon.

* * * * *